United States Patent
Petrovic

(10) Patent No.: US 6,388,425 B1
(45) Date of Patent: May 14, 2002

(54) RAPID BATTERY CHARGING METHOD AND APPARATUS

(76) Inventor: Vladimir Petrovic, c/o Key Capital Group Inc., Box 38, Suite 1370, 1140 West Pender Street, Vancouver, British Columbia (CA), V6E 4G1

( * ) Notice: Subject to any disclaimer, the term of this patent is extended or adjusted under 35 U.S.C. 154(b) by 0 days.

(21) Appl. No.: 09/986,827

(22) Filed: Nov. 13, 2001

Related U.S. Application Data

(63) Continuation of application No. PCT/CA00/00840, filed on Jul. 18, 2000.
(60) Provisional application No. 60/144,249, filed on Jul. 19, 1999.

(51) Int. Cl.⁷ ........................ H01M 10/44; H01M 10/46
(52) U.S. Cl. ........................ 320/130; 320/139
(58) Field of Search ................................ 320/124, 125, 320/128, 129, 130, 135, 139, 141, 145

(56) References Cited

U.S. PATENT DOCUMENTS

| | | | | |
|---|---|---|---|---|
| 3,963,976 A | * | 6/1976 | Clark | |
| 4,016,473 A | * | 4/1977 | Newman | |
| 5,304,914 A | * | 4/1994 | Feldstein | |
| 5,654,622 A | * | 8/1997 | Toya et al. | |
| 5,889,385 A | * | 3/1999 | Podrazhansky et al. | |
| 5,998,968 A | * | 12/1999 | Pittman et al. | |

* cited by examiner

*Primary Examiner*—Edward H. Tso
(74) *Attorney, Agent, or Firm*—Oyen Wiggs Green & Mutala

(57) ABSTRACT

Methods and apparatus for battery charging provide a charging cycle in which charging periods alternate with discharging periods. During the charging periods a lead acid battery is charged at a rate of about 0.55×C amperes to about 0.65×C amperes, where C is the battery capacity in ampere hours. The charging periods have durations of about 60 to 180 seconds. During the discharging periods the battery is discharged at a rate in the range of about 0.05×C to about 0.07×C. The discharge periods have durations of about 10 to 20 seconds. By introducing discharging periods while charging the battery, the battery's internal resistance is deceased and less heat is generated during charging. The charging time is about 1–2.5 hours for lead-acid batteries.

16 Claims, 4 Drawing Sheets

RAPID BATTERY CHARGING METHOD AND APPARATUS

CROSS REFERENCE TO RELATED APPLICATIONS

This application is a continuation of International application No. PCT/CA00/00840, filed on Jul. 18, 2000, which designates the United States. This application claims the benefit of the filing date of U.S. provisional application No. 60/144,249 entitled SEQUENTIAL PULSE METHOD FOR FAST BATTERY CHARGING, the entirety of which is incorporated herein by reference filed Jul. 19, 1999.

FIELD OF THE INVENTION

This invention relates to battery charging. In particular the invention relates to methods and apparatus for fast battery charging which provide a charge cycle during which a battery is periodically discharged. The invention has particular application in the rapid charging of lead-acid batteries.

BACKGROUND OF THE INVENTION

Charging a battery involves passing electrical current through the battery from a suitable direct current electrical power supply. The rate of charge depends upon the magnitude of the charging current. In theory it is possible to reduce charging time by using a higher charging current. In practice, however, there is a limit to the charging current that can be used. All batteries have some internal resistance. Power dissipated as the charging current passes through this internal resistance heats the battery. The heat generated as a battery is charged interferes with the battery's ability to acquire a full charge and, in an extreme case, can damage the battery itself.

Because the charging rate is limited it can take a long time to charge a battery to its capacity. In some cases, battery charging times as long as 16 hours are standard. The charging time for a particular battery depends upon the capacity and construction of the specific battery at issue.

Another problem with current battery chargers is that they are not always designed in a way which optimizes the service lives of batteries being charged. Some chargers provide an excessive charging current in order to provide reduced charging times.

Lead-Acid batteries are still the most practical type of battery for many heavy-duty applications such as engine-starting, powering electric vehicles, such as forklifts and the like. It is well known that Lead-Acid batteries should be charged within certain general parameters. It is generally considered that a Lead-Acid battery should never be charged to its full capacity at a rate greater than 10% to 15% of the battery's capacity. Faster charge increase battery temperature and may damage battery causing harmful over-charge and reduce its life. Larger charging currents may be applied for short periods when the battery is nearly flat to "boost" the battery. A typical multi-stage charger for Lead-Acid batteries applies three charge states. For a first period the charger passes a constant charging current through the battery. In a second period the charger applies a reduced topping charge. Finally the charger applies a float-charge. During the constant-current stage the battery charges to 70% in about five hours. The battery is given the remaining 30% of its maximum charge over about 5 hours by the topping charge. The float-charge which compensates for self-discharge after the battery has been fully charged.

In charging Lead-Acid batteries, it is also important to observe the cell voltage limit. The limit for the cells of a specific battery is related to the conditions under which the battery is charged. A typical voltage limit range is from 2.30 V to 2.45 V.

Some battery chargers have been proposed in which the battery under charge is discharged at various points in the charging cycle. This periodic discharging is said to reduce internal resistance and to reduce consequential heating of the battery. An example of such a charger is described in Pittman et al. U.S. Pat. No. 5,998,968. The Pittman et al. charging cycle applies a 2 millisecond discharge immediately before a 100 millisecond charging pulse. The discharge current is greater than the charging current. This pattern repeats at a frequency of about 10 Hertz. Rider et al. U.S. Pat. No. 5,499,234 is another example of this type of battery charger. The Rider et al. charger periodically discharges a battery with a discharge current which is about equal to the charging current. Ayres et al. U.S. Pat. No. 5,561,360 discloses a battery charger which initially applies a constant charging current. When the battery is partially charged, the Ayres et al. charger begins to periodically discharge the battery.

Patents which show other battery chargers are Samsioe, U.S. Pat. No. 4,179,648; Sethi, U.S. Pat. No. 3,622,857; Jones, U.S. Pat. No. 3,857,087; and, Brown Jr. et al., U.S. Pat. No. 5,617,005.

A common difficulty with battery-powered equipment is the progressive deterioration in reliability after about the first year of service. This phenomenon is mostly due to premature aging of the battery; a reversible capacity loss that is induced by "memory". Although fully charged, the battery eventually regresses to the point where it can hold less than half of its original capacity, resulting in unexpected down time. Furthermore, when a battery cannot be fully charged, the battery has a poor ratio of weight to capacity. This is especially significant in electric vehicles.

Some chargers use a temperature sensor, such as a thermistor, to measure the temperature of a battery being charged. The charging current can be reduced when the temperature rises above a threshold. Such temperature sensing is generally inaccurate because of the wide tolerance of the sensing thermistor and its positioning in respect to the cells of the battery.

Some manufacturers claim outrageously short charge times of 15 minutes, or even less, for nickel-cadmium (NiCd) batteries. With a NiCd battery in perfect condition in a temperature-controlled environment it is sometimes possible to charge the NiCd battery in a very short time by providing a very high charge current. In practical applications, with imperfect battery packs, such rapid charge times are almost impossible to achieve.

There is a need to achieve faster charging of batteries. There is a specific need to achieve faster charging of Lead-Acid batteries. There is a particular need for such chargers which are capable of fully charging a battery and do so in a way which does not reduce battery life.

SUMMARY OF THE INVENTION

This invention provides methods and apparatus for battery charging that address some of the above-noted deficiencies of prior battery charging technologies. One aspect of the invention provides a method for charging a battery having a capacity C (measured in Ampere hours). The method includes: for a charging period having a duration in the range of about 60 seconds to about 180 seconds, passing an electric current having a magnitude of $0.55 \times C$ to $0.65 \times C$ amperes through the battery; for a discharging period having a duration in the range of about 10 seconds to about 20 seconds allowing the battery to discharge a current having a magnitude in the range of about 0.05×C amperes to about 0.07×C amperes through a load; and, repeating these charging and discharging periods in alternating sequence until the battery is charged.

In preferred embodiments the duration of the charging period is in the range of about 100 seconds to about 140 seconds and the duration of the discharging period is in the range of about 10 seconds to about 17 seconds. In preferred embodiments the method includes waiting for a first rest period having a duration of no more than 2% of the duration of the charging period immediately before each charging period. During the first rest period, no current is flowing through the battery. Preferably a second short rest period having a duration of no more than 2% of the duration of the charging period follows each charging period. During the second rest period, no current is flowing through the battery. Preferably the first and second rest periods have durations of less than 200 milliseconds. The invention has specific application to lead-acid batteries and in the preferred embodiments the battery under charge is a lead-acid battery.

The power supply used to deliver charging current to the battery is preferably a constant-voltage power supply.

Another aspect of the invention provides a battery charger for charging a battery having a capacity C. The battery charger comprises: a power supply; a load; an electrically controllable switching circuit configured to connect either the power supply or the load between the terminals of a battery under charge; and, a control circuit comprising a timer, the control circuit configured to, during a charging cycle, operate the electrically controllable switching circuit to, in alternation, connect the power supply between the terminals of a battery under charge for a charging period having a duration of about 60 seconds to about 180 seconds, and connect the load between the terminals of the battery under charge for a discharging period having a duration in the range of about 10 seconds to about 20 seconds. The load has a resistance such that, during the discharge period, the battery discharges at a rate in the range of about 0.05×C to about 0.07×C.

In preferred embodiments the power supply is a constant-voltage power supply. Preferably the power supply is configured to supply a charging current having a magnitude in the range of about 0.55×C to about 0.65×C during the charging period to the battery under charge.

Some embodiments have a shut-off timer configured to discontinue the charging cycle after a period in the range of 100 minutes to 180 minutes. Most preferably the shut off timer ends the charging cycle in about 2 hours.

Some embodiments have a voltage comparator connected to compare a voltage of a battery under test to a reference voltage. In these embodiments the control circuit is configured to, before initiating the charging cycle, determine if the voltage comparator indicates that the battery voltage is greater than the reference voltage. If so, the control circuit connects the load between the terminals of the battery under charge until the battery voltage is equal to or less than the reference voltage. This ensures that batteries being charged are all started at about the same level of charge.

BRIEF DESCRIPTION OF THE DRAWINGS

In drawings which illustrate non-limiting embodiments of the invention.

LIST OF REFERENCE NUMERALS USED IN THE DRAWINGS

| | |
|---|---|
| 10 battery charger | 12 power supply |
| 14 load | 16 switch |
| 18 timer | 20 full charge detector |
| 22 battery charger | 40 power transformer |
| 41 primary contactor | 42 rectifier |
| 43 voltage select switch | 44 triac |
| 46 regulation circuit | 48 contactor |
| 50 ammeter | 51 polarity indicating lamp |
| 52 thermal cutout | 54 short circuit cut out |
| 58 potentiometer | 60 polarity protection circuit |
| 64 switch | 70 control circuit |
| 72 discharge contactor | 74 load |
| 76 resistor | 78 load disconnect switch |
| 80 pilot light | 82 start button |
| 84 stop button | 85 voltage comparator |
| 86 charge relay | 87 potentiometer |
| 88 discharge relay | 89 time counter |
| 90 oscillator | 92 trickle charge timer |

DETAILED DESCRIPTION

Figure 1:
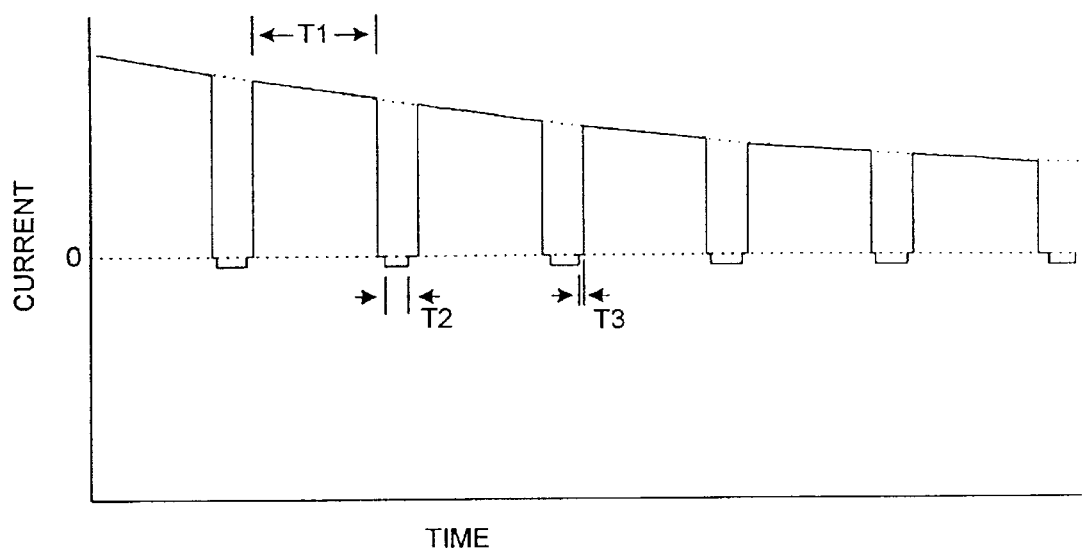
FIG. 1 is a plot of charging current as a function of time for a preferred embodiment of the invention.

As shown in FIG. 1, this invention provides a battery charging method which includes subjecting a battery to alternating charging and discharging periods. The charging periods have durations in the range of about 60 seconds to about 180 seconds (preferably in the range of about 100 seconds to about 140 seconds) during which the battery is charged at a rate in the range of 0.55×C Amperes to 0.65×C Amperes (where "C" is the capacity of the battery in Ampere-hours). Except as otherwise noted in this application, electrical currents are expressed in Amperes (A) and battery capacity is expressed in Ampere hours (Ah). The discharging periods have durations in the range of about 10 seconds to about 20 seconds (preferably in the range of about 13 seconds to about 17 seconds) during which the battery is discharged at a rate in the range of about 0.05×C to about 0.07×C. It has been found by the inventor that this charge cycle has unexpectedly beneficial effects in that, in comparison to standard charging cycles, it reduces the time taken to bring a battery to full charge and increases the total charge that can be delivered to the battery. This charging cycle has been found to produce only a small temperature rise during charging. This preserves the shelf life of batteries.

Preferably there are short rest periods before and after each charging period. The rest periods are preferably no longer than about 2% of the duration of the charging period and may be very short, for example about ⅕ second (about 200 milliseconds) or less. The charge-rest-discharge-rest pattern is repeated until the battery is fully charged. After the battery is fully charged then a floating charge cycle, as known in the prior art, may be applied to the battery to compensate for self-discharge of the battery. Full charge of the battery may be detected by monitoring the battery voltage. This is preferably done during the discharge periods.

Preferably a constant voltage is applied to the battery during the charge periods. As the battery acquires charge the charging current slowly decreases. This is shown in FIG. 1

(in a manner which has been greatly exaggerated for purposes only of illustration). Where a constant charging voltage is used so that the charging current is not the same for all charging periods the average charging current over all of the charging periods in the charging cycle should be in the range of 0.55×C to 0.65×C. It is permissible for the charging current in initial charging periods when the battery is essentially flat to somewhat exceed 0.65×C. A battery readily accepts energy when it is nearly flat and so a slightly increased charging current will not harm the battery.

For example, for a 60 Ampere-hour capacity battery (i.e. C=60), the charging current during the charging periods should be about 0.6×60=36 Amperes. During the discharge periods the discharge current should be about 0.06×60=3.6 Amperes. For a 700 Ampere-hour hour battery the charging current should be about 0.6×700=420 Amperes and the discharging current should be about 0.06×700=42 Amperes.

Figure 2:
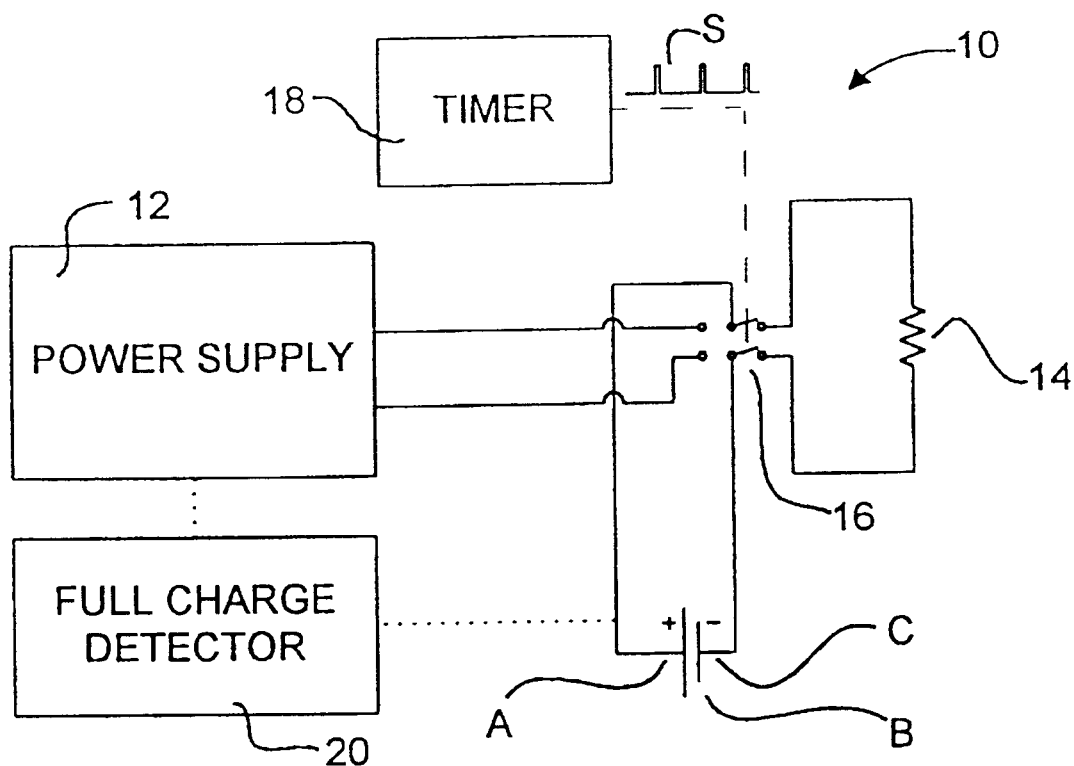
FIG. 2 is a block diagram of a battery charger according to a simple embodiment of the invention.

FIG. 2 shows one possible charging apparatus for practising the methods of this invention. A battery charger 10 has a power supply 12 which supplies a charging current suitable for the battery in question. Power supply 12 is preferably a constant voltage power supply. Charger 10 also includes a load 14. Load 14 is preferably a resistive load. For example, load 14 may comprise a high wattage resistor, or a number of high wattage resistors in parallel. Load 14 presents a resistance such that a current in the range of 0.05×C to 0.07×C flows through load 14 when load 14 is connected between the terminals A and C of a battery B which is under charge. A switch 16 controlled by a timer 18 can connect either power supply 12 or load 14 between terminals A and C of battery B. Timer 18 generates a signal S which causes switch 16 to alternate between a configuration in which power supply 12 is connected between terminals A and C for a charging period having a duration of 60–180 seconds and a configuration wherein load 14 is connected between terminals A and C for a discharging period having a duration of 10–20 seconds. Preferably charger 10 includes a shut-off circuit 20 which senses the voltage of battery B and shuts off charger 10 when battery B is fully charged.

Figure 3:
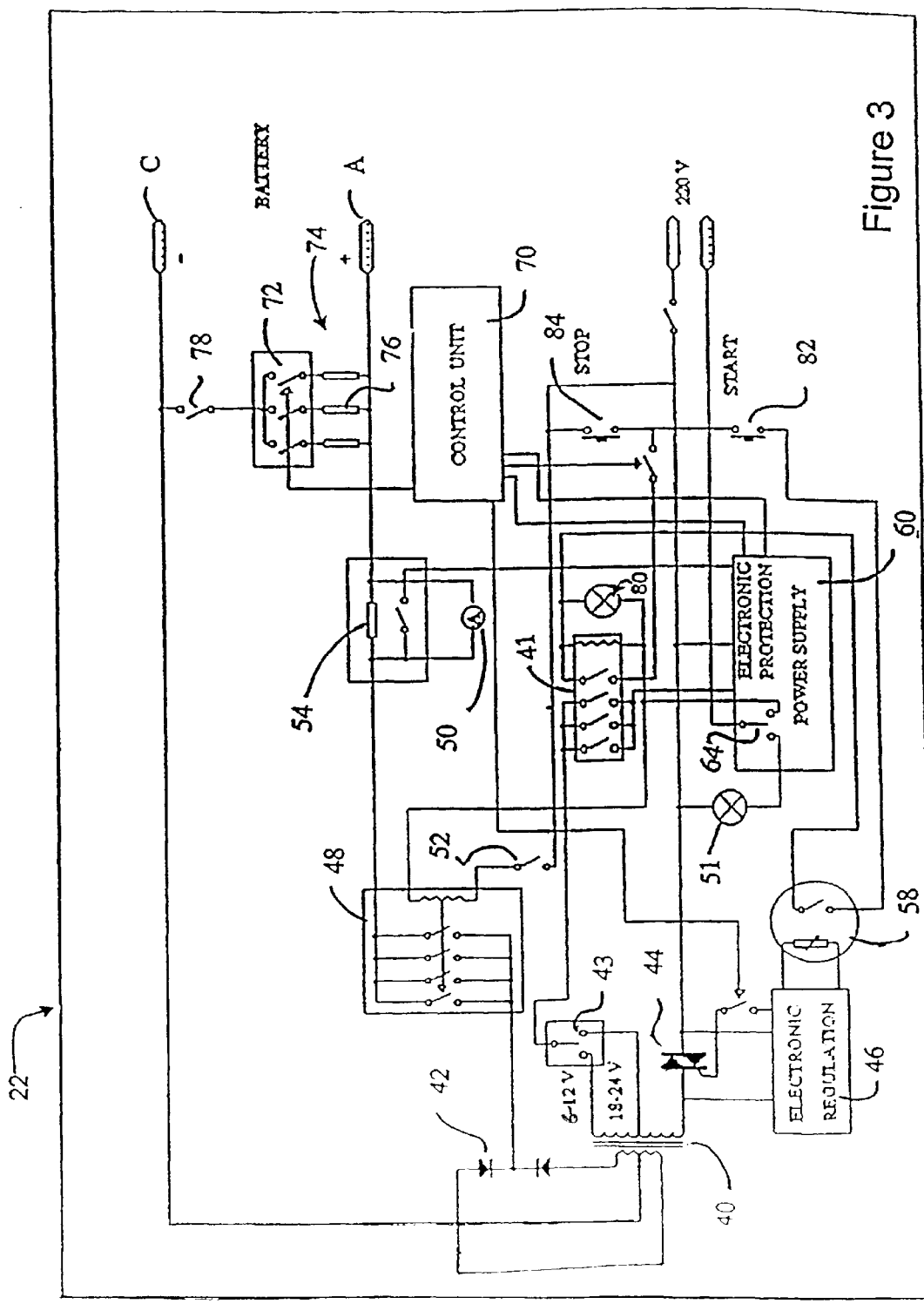
FIG. 3 is an electrical schematic for a fast charger according to a specific embodiment of the invention; and, FIG. 4 is schematic diagram of a charge control unit suitable for use in the invention.

The invention may be practised with the use of a conventional battery charger which has been modified by the installation of an electronic control module and a load. FIG. 3 shows an electrical schematic for a specific embodiment of fast charger 22 according to the invention. Fast charger 22 has a power supply section which comprises a power transformer 40, and a pair of rectifiers 42 which convert the alternating voltage output from transformer 40 to direct current. Mains power is supplied to transformer 40 by way of a primary contactor 41. Contactor 41 typically comprises a relay. However, contactor 41 may comprise any electrically controllable device capable of switching on or off the electrical power to transformer 40. A voltage output of the power supply can be selected by means of a voltage select switch 43.

Power to transformer 40 is controlled by a triac 44 which is triggered by an electronic regulation circuit 46. Triac 44 selectively permits rectified direct current to be applied to a battery under charge. A contactor 48 is provided to disconnect charging current from the battery under charge in case charger 22 overheats or needs to be shut down for some other reason. Contactor 48 may comprise a relay or any other electrically controllable device capable of switching on or off the charging current supplied to the battery under charge. When contactor 48 is closed and triac 44 is energized, electrical current can flow in a circuit which extends from rectifiers 42 through contactor 48, through the battery under test and back to power transformer 40.

An ammeter 50 is preferably provided to indicate the magnitude of the electrical current flowing through battery B during the charging periods. A polarity indicating lamp 51 can light to confirm that the leads of the charger have been connected to the correct terminals of the battery under charge (or in the alternative to warn a user that the battery has been connected the wrong way).

Preferably charger 22 has a thermal cut-out 52 which causes contactor 48 to open whenever charger 22 becomes overheated and a short circuit cut out 54, which may be a thermomagnetic protector, which prevents damage to charger 22 by disconnecting the charger in the event of a short circuit between the leads which are connected to the battery under charge. Thermal cut out 52 is preferably of a type such that it is automatically reconnected a short time after the temperature of the charger returns to normal. For example, when thermal cutout 52 shuts charger 22 off it may automatically reconnect the charger after approximately 10 minutes.

The charging current delivered by charger 22 is regulated by circuit 46. A potentiometer 58 allows the charging current to be adjusted to be appropriate for the battery under charge. An electronic protection circuit 60 prevents charger 22 from operating if no battery is connected to the charger or if a battery is connected with reverse polarity. If a battery is connected with reverse polarity then protection circuit 60 switches switch 64 so that lamp 51 is lit and no power is available to cause contactor 48 to close. If a battery is correctly connected to charger 22 then protection circuit 60 switches switch 64 under the control of control circuit 70 so as to supply power to cause contactor 48 to close.

Charger 22 has a discharge contactor 72 which, when closed, connects a load 74, which may comprise resistors 76 across the terminals of the battery under charge. Contactor 72 may comprise a relay or any other electrically controllable device capable of connecting load 74 between the terminals of a battery under charge. Charger 22 has a switch 78 which can be manually opened to disable the discharging function of charger 22. A pilot light 80 indicates when primary contactor 41 of charger 22 is closed. Start and stop switches 82 and 84 permit the charging cycle to be initiated or discontinued.

Most of the parts of charger 22 except for control circuit 70 load 74, switch 78, discharge contactor 72 can be found in conventional battery chargers and their operation is well understood to those skilled in the art.

A procedure for using charger 22 to charge a battery is as follows:

Set "VOLTAGE" select switch 43 to a position appropriate for the battery under charge. Position "6–12" is for batteries of 6 or 12 Volts. Position "18–24" is for batteries that have voltages of 18 to 24 V (for example batteries made up of three or four six-volt batteries, or two twelve volt batteries connected in series).

Place switch 78 in its closed position.

Set REGULATION potentiometer 58 to its reset position. In this position a switch 58A associated with potentiometer 58 is closed.

Momentarily press the START button 82. This causes primary contactor to close. Pilot lamp 80 is lit.

Turn the REGULATION potentiometer 58 until the appropriate charge rate for the battery under charge is indicated on ammeter 50.

Control circuit 70 of charger 22 preferably includes a timer that switches charger 22 off after a suitable interval, such as two hours.

If a Lead Acid battery has been inactive over a long period of time, it may have sulfated. This state of sulfating is characterized by the battery's acquiring of a far higher internal resistance than normal. When being charged, a sulfated battery behaves in a different way than a battery in good condition. The charge rate increases during charging, instead of falling. This is because charging the battery reduces sulfation on the plates. This reduces internal resistance in the battery. Once regenerated, the battery will behave normally. A sulfated battery should be recharged at a lower rate than would be appropriate for a battery in good condition.

The following tables list maximum recommended charging rates for lead acid batteries in good condition at normal room temperature:

TABLE 1

RECOMMENDED CHARGING RATES (6 volt batteries)

| Battery Capacity (Ah) | Battery Voltage (V) | Initial Charging Rate (A) | Voltage Switch Postition |
|---|---|---|---|
| 35 | 6 | 21 | 6–12 |
| 45 | 6 | 27 | 6–12 |
| 55 | 6 | 33 | 6–12 |
| 65 | 6 | 39 | 6–12 |
| 80 | 6 | 48 | 6–12 |

TABLE 11

RECOMMENDED CHARGING RATES (12 volt batteries)

| Battery Capacity (Ah) | Battery Voltage (V) | Initial Charging Rate (A) | Voltage Switch Position |
|---|---|---|---|
| 35 | 12 | 21 | 6–12 |
| 45 | 12 | 27 | 6–12 |
| 55 | 12 | 33 | 6–12 |
| 65 | 12 | 39 | 6–12 |
| 80 | 12 | 48 | 6–12 |

TABLE III

RECOMMENDED CHARGING RATES (18 and 24 volt batteries)

| Battery Capacity (Ah) | Battery Voltage (V) | Initial Charging Rate (A) | Voltage Switch Position |
|---|---|---|---|
| 35 | 18 | 21 | 18–24 |
| 45 | 18 | 27 | 18–24 |
| 55 | 18 | 33 | 18–24 |
| 35 | 24 | 21 | 18–24 |
| 45 | 24 | 27 | 18–24 |
| 55 | 24 | 33 | 18–24 |

Figure 4:
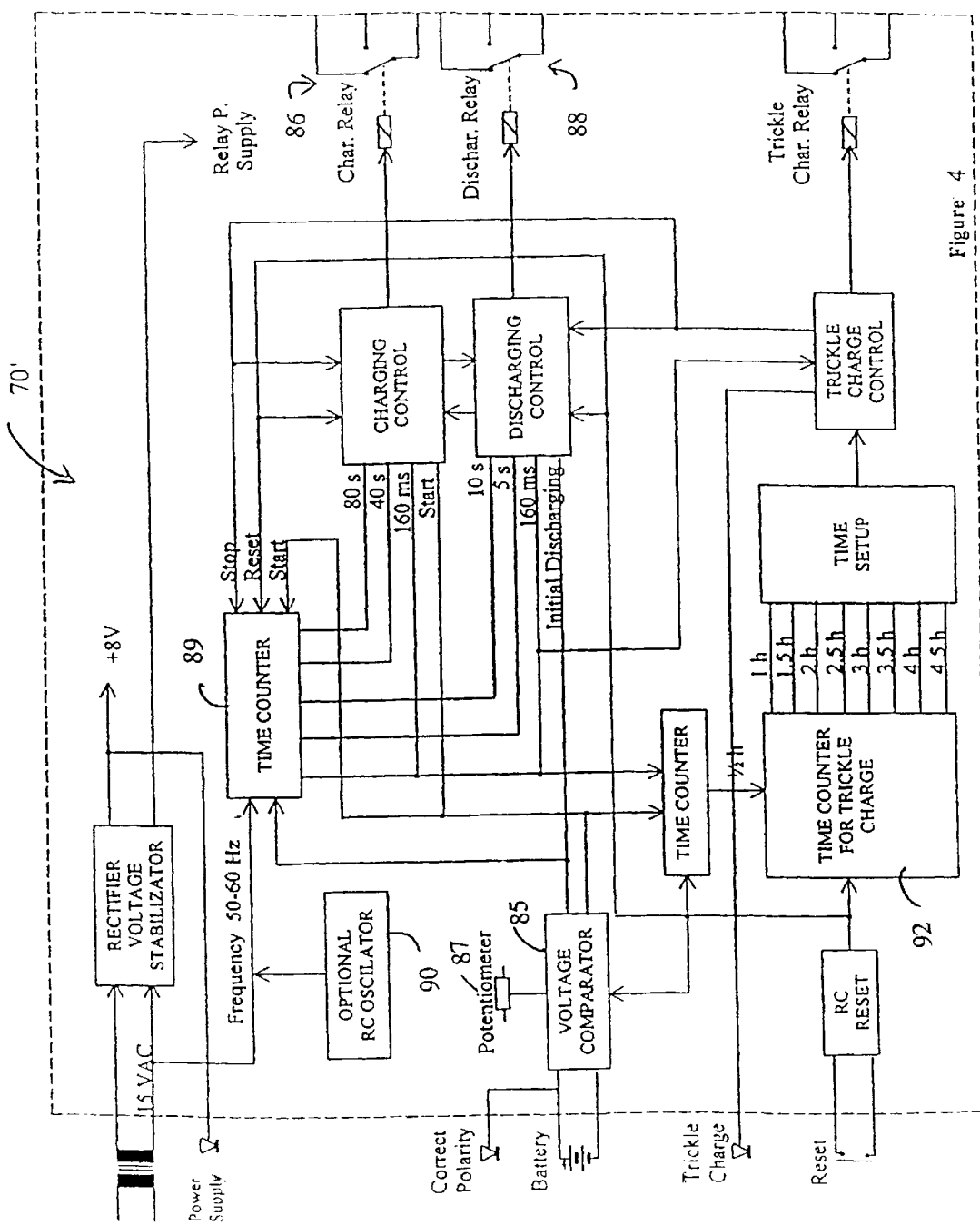

FIG. 4 is a block diagram of a possible control unit 70'. Control unit 70' operates a charger 22 by alternately operating a charge relay 86 and a discharge relay 88 to provide periods of charging, rest and discharging according to the method of the invention, which is described above. When power is first supplied to control unit 70 an initial RESET impulse is generated. This resets all counters.

A voltage comparator 85 monitors the voltage of the battery under charge. If the battery voltage is higher than a predetermined voltage, as set by a potentiometer 87 control unit 70 commences an initial discharging period in which the battery is connected to a load 14. As the battery is discharged its voltage decreases. When the battery voltage falls to a point at which it is equal to the preset voltage a START signal by comparator 85. In response to the START signal the discharge relay is opened and the charge relay is closed. If the battery under charge initially has a voltage which is equal to or lower than the preset voltage then the START signal is generated immediately by voltage comparator 85.

A time counter 89, which may have its own oscillator 90, or which may use the frequency of supplied alternating current power for timing, is used to control the length of charging, rest and discharging periods. Time counter 89 has outputs which change state so as to turn off charging relay 86 approximately 60–200 seconds after it is turned on, and to turn on the discharging relay about 100–200 milliseconds after the charging relay is turned off. The discharging relay stays on for about 10 to 20 seconds. About 100–200 milliseconds after the discharging relay is turned off the charging relay is again activated and the alternating charging periods and discharging periods repeat until the end of the charging cycle by which time the battery is charged. A shut-off timer may be provided to discontinue the charging cycle after a time in the range of 1½ hours to 3 hours (most preferably about 2 hours). The duration of the charging cycle is chosen so that a battery will just be fully charged at the end of the charging cycle. Those skilled in the art will understand that any of a wide variety of well known timing circuits and techniques may be used to operate the charging and discharging relays in alternating sequence as described herein.

Preferably the battery under charge continues to be charged by a trickle charger after the charging cycle ends. In the illustrated embodiment, a trickle charge timer 92 generates impulses after 1; 1.5; 2; 2.5; 3; 3.5; 4 and 4.5 hours. Any of these 8 time periods can be chosen for tickle charging.

The use of this invention provides significant benefits in charging lead acid batteries. Total charge time is approximately two hours. This is significantly faster than is possible with conventional battery chargers which charge at constant currents of less than 0.15×C. The cycle of repeatedly charging and discharging a battery for the time periods set out above can help to reduce the "memory" effect which can reduce the capacity of a battery over time. The maximum charge that can be imparted to a battery is increased when the methods of the invention are used as a result of decreased heating.

It can be appreciated that existing battery chargers can be readily modified to provide the charging cycle of this invention. Charging current does not need to be switched on and off at high frequency as is required by some previous charging technologies.

As will be apparent to those skilled in the art in the light of the foregoing disclosure, many alterations and modifications are possible in the practice of this invention without departing from the spirit or scope thereof. For example:

While the invention is particularly useful for recharging Lead-Acid batteries, the invention could also be used for charging other types of batteries. For NiCd and NiMH batteries the charge current should be in the range of about 0.9×C to about 1.1×C. The discharge current should be in the range of about 0.05×C to about 0.07×C.

The discharge periods are not necessary when the battery is nearly flat. The invention could be practised by charging a battery at a substantially constant current for 15 minutes or so and then commencing the alternating cycle of charging periods and discharging periods as described herein.

Accordingly, the scope of the invention is to be construed in accordance with the substance defined by the following claims.

What is claimed is:

1. A method for charging a battery having a capacity C Ampere hours, the method comprising:
   a) for a charging period having a duration in the range of about 60 seconds to about 180 seconds, passing an electric current having a magnitude of $0.55 \times C$ Amperes to $0.65 \times C$ Amperes through the battery;
   b) for a discharging period having a duration in the range of about 10 seconds to about 20 seconds allowing the battery to discharge a current having a magnitude in the range of about $0.05 \times C$ Amperes to about $0.07 \times C$ Amperes through a load; and,
   c) repeating (a) and (b) in alternating sequence until the battery is charged.

2. The method of claim 1 wherein the duration of the charging period is in the range of about 100 seconds to about 140 seconds.

3. The method of claim 2 wherein the duration of the discharging period is in the range of about 10 seconds to about 17 seconds.

4. The method of claim 1 wherein the duration of the discharging period is in the range of about 10 seconds to about 17 seconds.

5. The method of claim 1 comprising, immediately before each charging period, waiting for a first rest period having a duration of no more than 2% of the duration of the charging period wherein, during the first rest period, no current is flowing through the battery.

6. The method of claim 5 comprising, immediately after each charging period, waiting for a second rest period having a duration of no more than 2% of the duration of the charging period wherein, during the second rest period, no current is flowing through the battery.

7. The method of claim 6 wherein the second rest period has a duration of less than 200 milliseconds.

8. The method of claim 1 wherein the battery is a lead-acid battery.

9. The method of claim 8 wherein the power supply is a constant-voltage power supply.

10. The method of claim 1 comprising, before initiating the to charge the battery, monitoring a voltage of the battery and, if the voltage of the battery is greater than a threshold value, discharging the battery until the battery voltage is equal to or less than the threshold value.

11. The method of claim 10 wherein discharging the battery is performed by causing the battery to supply a discharge current having a magnitude in the range of about $0.05 \times C$ Amperes to about $0.07 \times C$ Amperes.

12. A battery charger for charging a battery having a capacity C Ampere hours, the battery charger comprising:
   a) a power supply;
   b) a load;
   c) an electrically controllable switching circuit configured to connect either the power supply or the load between the terminals of a battery under charge;
   d) a control circuit comprising a timer, the control circuit configured to, during a charging cycle, operate the electrically controllable switching circuit to, in alternation, connect the power supply between the terminals of a battery under charge for a charging period having a duration of about 60 seconds to about 180 seconds, and connect the load between the terminals of the battery under charge for a discharging period having a duration in the range of about 10 seconds to about 20 seconds;
   wherein, the load has an impedance such that, during the discharge period, the battery discharges at a rate in the range of about $0.05 \times C$ Amperes to about $0.07 \times C$ Amperes.

13. The battery charger of claim 12 wherein the power supply is a constant-voltage power supply.

14. The battery charger of claim 12 wherein the power supply is configured to supply a charging current having a magnitude in the range of about $0.55 \times C$ Amperes to about $0.65 \times C$ Amperes during the charging period to the battery under charge.

15. The battery charger of claim 12 comprising a shut-off timer configured to discontinue the charging cycle after a period in the range of 100 minutes to 180 minutes.

16. The battery charger of claim 12 comprising a voltage comparator connected to compare a voltage of a battery under test to a reference voltage wherein the control circuit is configured to, before initiating the charging cycle, determine if the voltage comparator indicates that the battery voltage is greater than the reference voltage and, if so, connect the load between the terminals of the battery under charge until the battery voltage is equal to or less than the reference voltage.

* * * * *